United States Patent
Ben-Itzhak et al.

(10) Patent No.: US 11,687,824 B2
(45) Date of Patent: Jun. 27, 2023

(54) INTELLIGENT DATA PARTITIONING FOR DISTRIBUTED MACHINE LEARNING SYSTEMS

(71) Applicant: VMware, Inc., Palo Alto, CA (US)

(72) Inventors: Yaniv Ben-Itzhak, Afek (IL); Shay Vargaftik, Nazareth-Illit (IL)

(73) Assignee: VMware, Inc., Palo Alto, CA (US)

( * ) Notice: Subject to any disclaimer, the term of this patent is extended or adjusted under 35 U.S.C. 154(b) by 1200 days.

(21) Appl. No.: 16/248,622

(22) Filed: Jan. 15, 2019

(65) Prior Publication Data

US 2020/0226491 A1 Jul. 16, 2020

(51) Int. Cl.
*G06N 20/00* (2019.01)
*G06N 5/045* (2023.01)
*G06F 16/28* (2019.01)

(52) U.S. Cl.
CPC .......... *G06N 20/00* (2019.01); *G06F 16/285* (2019.01); *G06N 5/045* (2013.01)

(58) Field of Classification Search
None
See application file for complete search history.

(56) References Cited

U.S. PATENT DOCUMENTS

| | | |
|---|---|---|
| 9,578,050 B1 | 2/2017 | Barabash et al. |
| 10,380,504 B2* | 8/2019 | Bendre ............... G06F 9/46 |
| 2004/0117403 A1* | 6/2004 | Horn ................. G06F 16/353 |
| 2013/0290223 A1* | 10/2013 | Chapelle ............ G06N 20/00 706/12 |
| 2019/0236485 A1* | 8/2019 | Stanley, III ......... H04L 67/303 |
| 2020/0092392 A1* | 3/2020 | Seelam .................. G06N 3/08 |

* cited by examiner

*Primary Examiner* — Daniel T Pellett

(57) ABSTRACT

Techniques for implementing intelligent data partitioning for a distributed machine learning (ML) system are provided. In one set of embodiments, a computer system implementing a data partition module can receive a training data instance for a ML task and identify, using a clustering algorithm, a cluster to which the training data instance belongs, the cluster being one of a plurality of clusters determined via the clustering algorithm that partition a data space of the ML task. The computer system can then transmit the training data instance to a ML worker of the distributed ML system that is assigned to the cluster, where the ML worker is configured to build or update a ML model using the training data instance.

21 Claims, 10 Drawing Sheets

INTELLIGENT DATA PARTITIONING FOR DISTRIBUTED MACHINE LEARNING SYSTEMS

BACKGROUND

Machine learning is an application of artificial intelligence that enables a computer system to automatically learn how to execute, as well as improve its performance of, specific tasks. Examples of such tasks include filtering spam emails, detecting objects in images, identifying phonemes in voice samples, and so on.

Machine learning for a given task is typically implemented in two phases: a training phase and a classification query phase. These two phases may be run concurrently or sequentially. During the training phase, the computer system receives training data corresponding to labeled input data for the task (in other words, input data that is labeled with the correct decision/classification result that should be generated for that input). For instance, if the task is filtering spam emails, the training data may include sample emails that are labeled as spam or not spam. Using this training data, the computer system builds, via a machine learning algorithm, a mathematical model (referred to herein as a ML model) for correctly performing the task.

During the query phase, the computer system receives query data corresponding to unlabeled (i.e., unknown) input data for the task. Upon receiving an unlabeled input data instance, the computer system passes the data instance to the ML model built via the training phase. The ML model then generates a decision/classification result for the unlabeled input data instance and this result is forwarded to the query originator. For instance, returning to the example of filtering spam emails, the ML model will generate a classification for an unknown email as either spam or not spam. As the computer system receives and processes more and more training data via the training phase, its ML model will generally become more and more proficient at generating correct results for query data received during the query phase.

In the case of large-scale machine learning tasks that involve processing large amounts of training data and/or building highly complex ML models (i.e., models with a large number of parameters and/or classes), a single physical computer system is often insufficient for handling the processing load imposed by the training and query phases. Accordingly, for such large-scale tasks, distributed systems have been implemented for dividing the processing load among a number of distinct computing nodes (referred to herein as ML workers). Such existing distributed systems generally operate according to a shared ML model paradigm—in other words, a paradigm where a single, global ML model is shared and synchronized across all of the system's ML workers. However, this sharing/synchronization incurs several drawbacks. For example, synchronizing model parameters between ML workers can require a significant amount of network bandwidth, which can potentially saturate the links interconnecting the workers. Further, many machine learning algorithms are entirely sequential, while many others contain sequential parts. As a result, these algorithms require synchronization barriers in a distributed implementation, which can degrade performance if the cost of the barriers and/or the communication latency between ML workers is high.

SUMMARY

Techniques for implementing intelligent data partitioning for a distributed machine learning (ML) system are provided. In one set of embodiments, a computer system implementing a data partition module can receive a training data instance for a ML task and identify, using a clustering algorithm, a cluster to which the training data instance belongs, the cluster being one of a plurality of clusters determined via the clustering algorithm that partition a data space of the ML task. The computer system can then transmit the training data instance to a ML worker of the distributed ML system that is assigned to the cluster, where the ML worker is configured to build or update a ML model using the training data instance.

The following detailed description and accompanying drawings provide a better understanding of the nature and advantages of particular embodiments.

DETAILED DESCRIPTION

Figure 1:
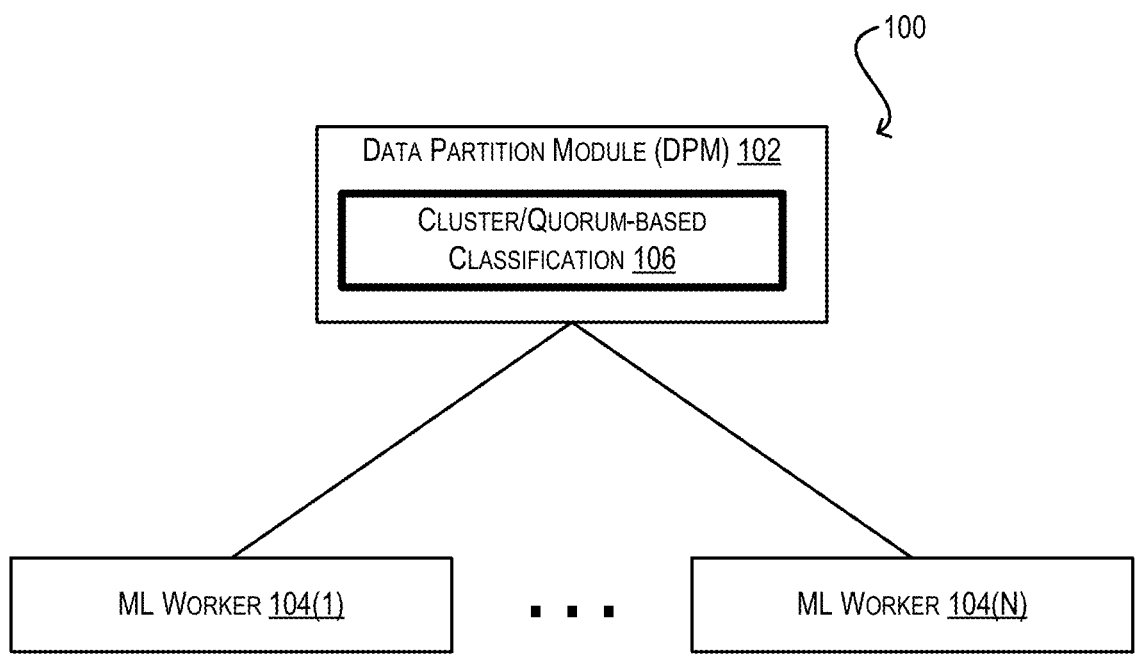
FIG. 1 depicts a distributed machine learning system that implements the techniques of the present disclosure according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for implementing an intelligent data partition module for a distributed machine learning system. According to one set of embodiments, the intelligent data partition module can be a cluster-based data partition module. In these embodiments, during the training phase for a machine learning task, the cluster-based data partition module can partition training data among the system's ML workers such that each ML worker receives training data instances belonging to a particular portion (i.e., cluster) of the task's overall input data space. Using this partitioned training data, each ML worker can build a separate ML model for the task that is specific to the worker's assigned cluster.

Then, during the query phrase, the cluster-based data partition module can receive a query data instance, identify the cluster to which the data instance belongs, and transmit the query data instance to the ML worker assigned to that cluster. In response, the ML worker can process the query data instance and return a decision/classification result to the data partition module, which can forward the result to the query originator.

According to another set of embodiments, the intelligent data partition module can be a quorum-based data partition module. As used herein, a "quorum" is a set of one or more clusters for a data instance that includes (A) the cluster to which the data instance belongs, and (B) potentially other clusters, where the strength of clustering associations between the data instance and those other clusters are approximately the same as the strength of the clustering association between the data instance and its actual cluster. In these embodiments, during the training phase for a machine learning task, the quorum-based data partition module can partition training data for the task among the system's ML workers such that each ML worker receives (1) training data instances that belong to the worker's assigned cluster, and (2) other training data instances that do not belong to the worker's assigned cluster, but do belong to a quorum which includes that cluster. Using (1) and (2), each ML worker can build a separate ML model for the task that is specific to the worker's "quorum of data" (in other words, the worker's assigned cluster, plus all additional data instances that include this cluster in their quorums).

Then, during the query phrase, the quorum-based data partition module can receive a query data instance, identify the quorum to which the query data instance belongs, and transmit the query data instance to the ML worker(s) assigned to the cluster(s) in the quorum. In response, the ML worker(s) can process the query data instance and return decision/classification result(s) to the quorum-based data partition module. In the case where multiple decision/classification results are returned, the quorum-based data partition module can compile the multiple results into a single final result before forwarding it to the query originator.

The foregoing and other aspects of the present disclosure are described in further detail in the sections below.

2. System Architecture

FIG. 1 is a simplified block diagram of a distributed machine learning system 100 that implements the techniques of the present disclosure. As shown, system 100 includes a data partition module 102 that is communicatively coupled with a plurality of computing nodes (i.e., ML workers) 104(1)-(N). Data partition module 102 and ML workers 104(1)-(N) can each be implemented using a general-purpose computer system, a dedicated hardware appliance/device, or a virtual machine (VM). Further, although not depicted, ML workers 104(1)-(N) can be connected to each other via a network that is the same as, or separate from, the network interconnecting ML workers 104(1)-(N) and data partition module 102.

In a conventional distributed machine learning system, the data partition module typically partitions training data for a task among the system's ML workers in a random manner. The ML workers then compute and agree upon a single global (i.e., shared) ML model for the task using the received training data. However, as noted in the Background section, this shared ML model paradigm suffers from a number of drawbacks arising out of the need to perform synchronization between ML workers.

One way to avoid synchronization is for each ML worker to build its own, independent ML model based on the random training data that the worker has received. However, this approach results in N smaller and potentially less accurate ML models. Thus, querying a single ML worker during the query phase will likely result in poorer ML performance than the shared model paradigm. At the same time, querying all N ML workers to improve ML performance can result in very high query overhead (due to the required CPU cycles and network bandwidth) and slow query response (due to the need to wait for all workers to generate a result, and to compile the N results into a final result on the data partition module).

To address the foregoing issues, data partition module 102 of FIG. 1 is enhanced to include a novel cluster/quorum-based classification component 106. Cluster/quorum-based classification component 106 may be implemented in software, hardware, or a combination thereof. As detailed in the sections that follow, cluster/quorum-based classification component 106 enables data partition module 102 to intelligently partition training and query data instances for a task T among ML workers 104(1)-(N) based on (1) the portion (i.e., cluster) of T's input data space to which the data instance belongs, or (2) the quorum of cluster(s) to which the data instance belongs. Approach (1) is referred to as the cluster-based approach and approach (2) is referred to as the quorum-based approach.

With these techniques, each ML worker 104 can effectively become an "expert" for its assigned cluster (in the cluster-based approach) or for a quorum of data including its assigned cluster (in the quorum-based approach). As a result, these techniques advantageously allow the processing load for task T to be spread across ML workers 104(1)-(N), without incurring synchronization overhead (since the per-worker ML models are independent) and without adversely affecting querying performance (since only the ML worker (s) corresponding to a query data instance's cluster/quorum need to be queried).

It should be appreciated that distributed machine learning system 100 of FIG. 1 is illustrative and not intended to limit embodiments of the present disclosure. For example, although FIG. 1 depicts a particular arrangement of entities in system 100, other arrangements or configurations are possible depending on the specific implementation. Further, the various entities shown may have subcomponents or functions that are not specifically described. One of ordinary skill in the art will recognize other variations, modifications, and alternatives.

3. Cluster-Based Approach

Figure 2:
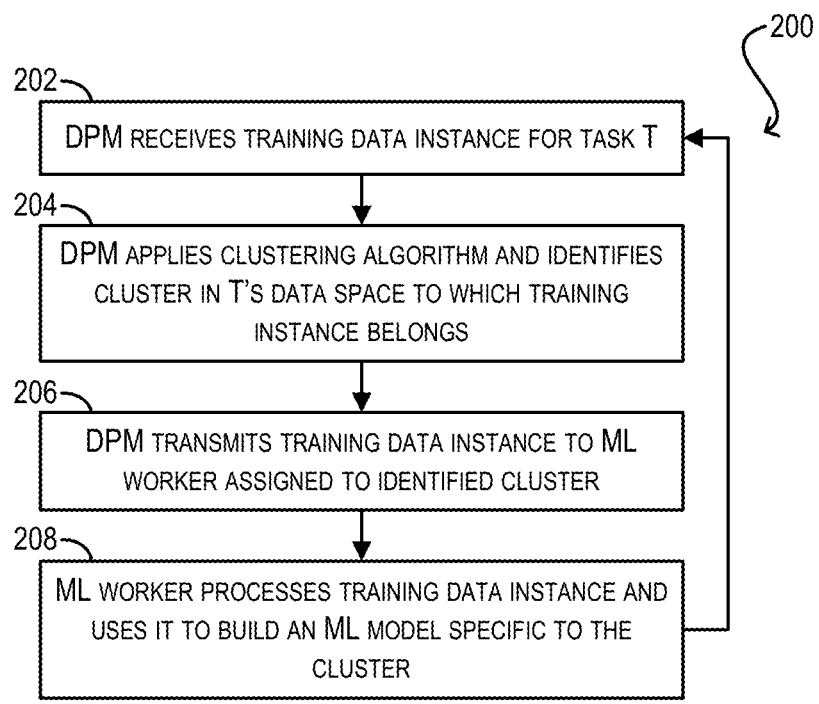
FIG. 2 depicts a workflow for executing the training phase for a machine learning task via the cluster-based approach according to an embodiment.
Figure 3:
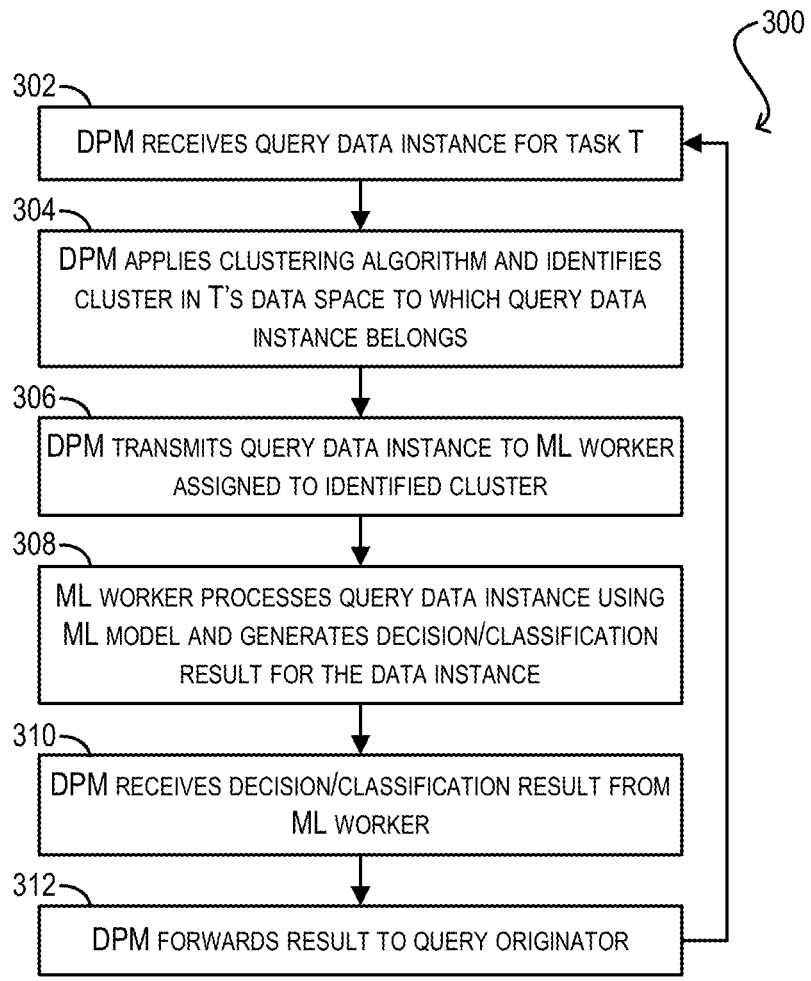
FIG. 3 depicts a workflow for executing the query phase for a machine learning task via the cluster-based approach according to an embodiment.

FIGS. 2 and 3 depict high-level workflows 200 and 300 that may be implemented by data partition module 102 of FIG. 1 (via classification component 106) for executing the training and query phases respectively for a machine learning task T via the cluster-based approach according to an embodiment. For ease of explanation, FIGS. 2 and 3 assume that data partition module 102 processes a single training data instance (in the case of workflow 200) or a single query data instance (in the case of workflow 300) at a time. However, in certain embodiments, data partition module 102 can process multiple training/query data instances (e.g., a batch of data instances) in parallel via these workflows. Further, FIG. 2 assumes that data partition module 102 and ML workers 104(1)-(N) operate according to an "online-online" data availability model, such that each of these entities processes incoming training data on-the-fly (i.e., as it is received). However, other data availability models are possible and are discussed in section (6) below.

Starting with workflow 200 of FIG. 2 (training phase), data partition module 102 can receive a training data instance (i.e., a labeled data instance) for task T (block 202) and can apply a clustering algorithm in order to identify a cluster of T's overall input data space to which the training data instance belongs (i.e., is most strongly associated with). As known in the art, a clustering algorithm is an algorithm that is used to group a set of data instances such that those data instances in the same cluster are more strongly associated (according to a specific definition) to each other than to those in other clusters. Examples of known clustering algorithms include K-means, DBSCAN, SLINK, and CLINK.

In some embodiments, the particular clustering algorithm employed at block 204 may be chosen independently of the machine learning functionality provided by ML workers 104(1)-(N). In other embodiments, the clustering algorithm may be chosen to complement the machine learning functionality provided by ML workers (e.g., a clustering algorithm that enhances the performance of the machine learning algorithm running on the workers). In yet other embodiments, the clustering algorithm may be dependent on (i.e., dictated by) the machine learning functionality provided by ML workers. In this third scenario, the clustering performed at block 204 may represent a first stage of the machine learning algorithm executed at the worker level. For example, in a decision tree, the few top levels of the tree may be determined via the clustering performed by data partition module 102 whereas the lower, different branches of the decision tree may be spread among the ML workers.

Upon identifying the cluster to which the training data instance belongs, data partition module 102 can transmit the training data instance to a particular ML worker 104 that is assigned to that cluster (block 206). In the general case, each ML worker will be assigned to a single cluster, although in some cases one large cluster may be split and assigned to multiple clusters or vice versa (see the "Handling Unbalanced Clusters" section below).

Then, at block 208, the receiving ML worker can process the training data instance using its machine learning algorithm and thereby build (or build upon) an ML model for the worker's assigned cluster using the received data. Finally, at the conclusion of block 208 (or block 206), data partition module 102 can return to block 202 in order to ingest and process additional training data instances as needed.

Turning now to workflow 300 of FIG. 3 (query phase), data partition module 102 can receive a query data instance (i.e., an unlabeled data instance) for task T from a query originator (e.g., a client) (block 302) and can apply the same clustering algorithm as workflow 200 in order to identify the cluster to which the query data instance belongs (block 304).

Upon identifying the query data instance's cluster, data partition module 102 can transmit the query data instance to the particular ML worker assigned to that cluster (block 306), and the ML worker can process the data instance using its ML model in order to generate a decision/classification result (block 308). Then, at blocks 310 and 312, data partition module 102 can receive the result from the ML worker and forward the result to the query originator. Finally, at the conclusion of block 312, data partition module 102 can return to block 302 in order to ingest and process additional query data instances as needed.

4. Quorum-Based Approach

One limitation with the cluster-based approach described above is that it may not work well for task datasets that do not naturally form well-defined clusters. For such scenarios, the quorum-based approach may be used. As mentioned previously, a quorum for a data instance is a set of clusters that includes (A) the cluster to which the data instance belongs, and (B) possibly other clusters, where the strength of clustering associations between the data instance and those other clusters is approximately the same (based on some specific definition of "sameness") as the strength of the clustering association between the data instance and its actual cluster.

Figure 4:
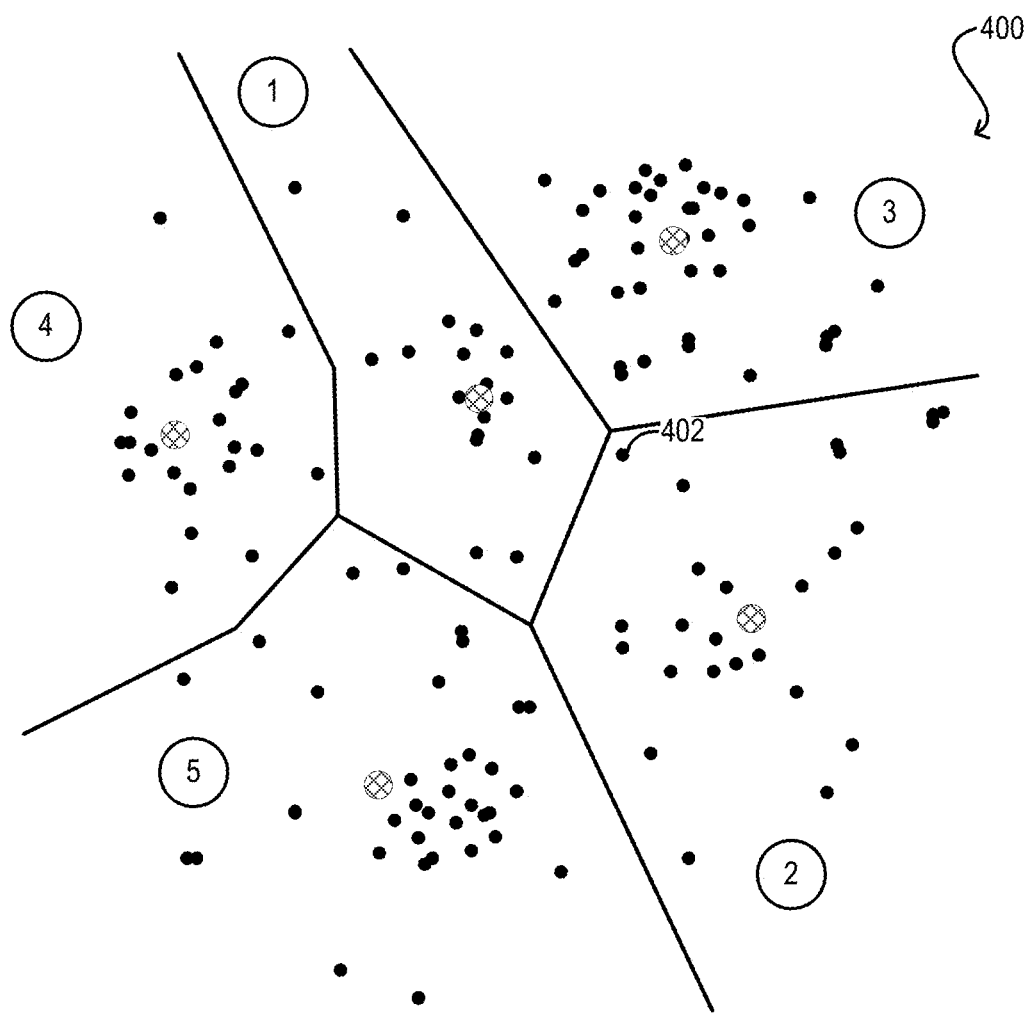
FIG. 4 depicts an example K-means clustering.

To explain this visually, consider the K-means clustering example 400 depicted in FIG. 4, which illustrates four clusters (1), (2), (3), (4), and (5). In this example, data instance 402 technically belongs to (i.e., is most strongly associated with) cluster (2); however, the distances between data instance 402 and the centroids (shown as the large dots with cross-hatch fill) of clusters (1), (2), and (3) respectively are about the same. Accordingly, in this example it is said that data instance 402 belongs to quorum [1, 2, 3]. By partitioning training and query data based on their quorums in the quorum-based approach (rather than based on their individual clusters in the cluster-based approach), data partition module 102 can enable distributed system 100 to achieve better machine learning performance for tasks that do not cluster well.

Figure 5:
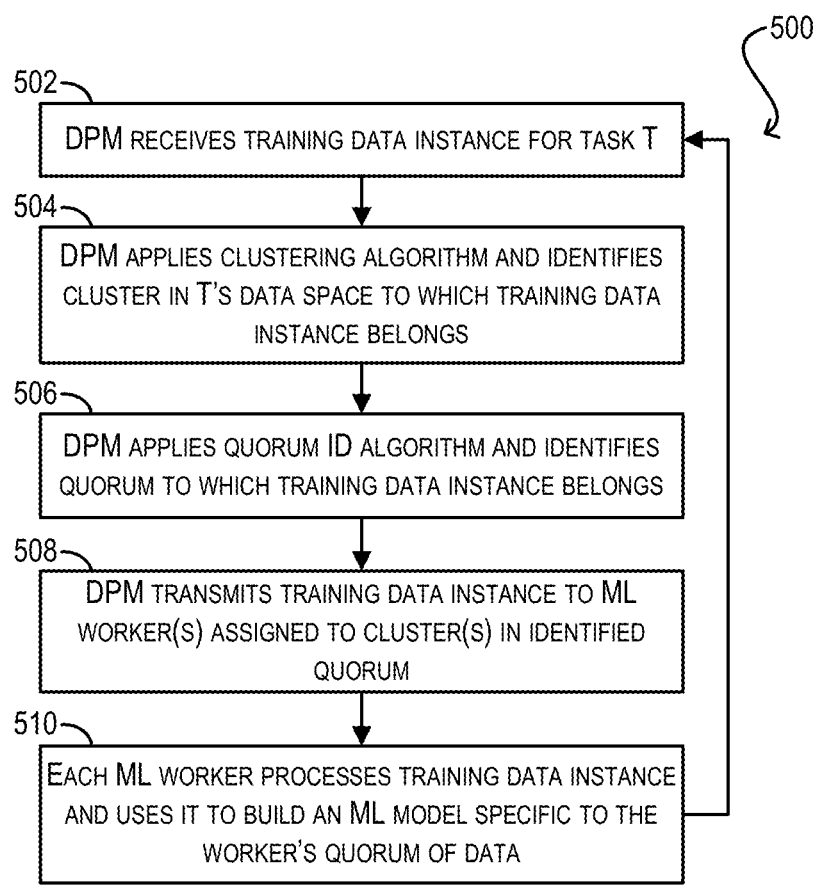
FIG. 5 depicts a workflow for executing the training phase for a machine learning task via the quorum-based approach according to an embodiment.
Figure 6:
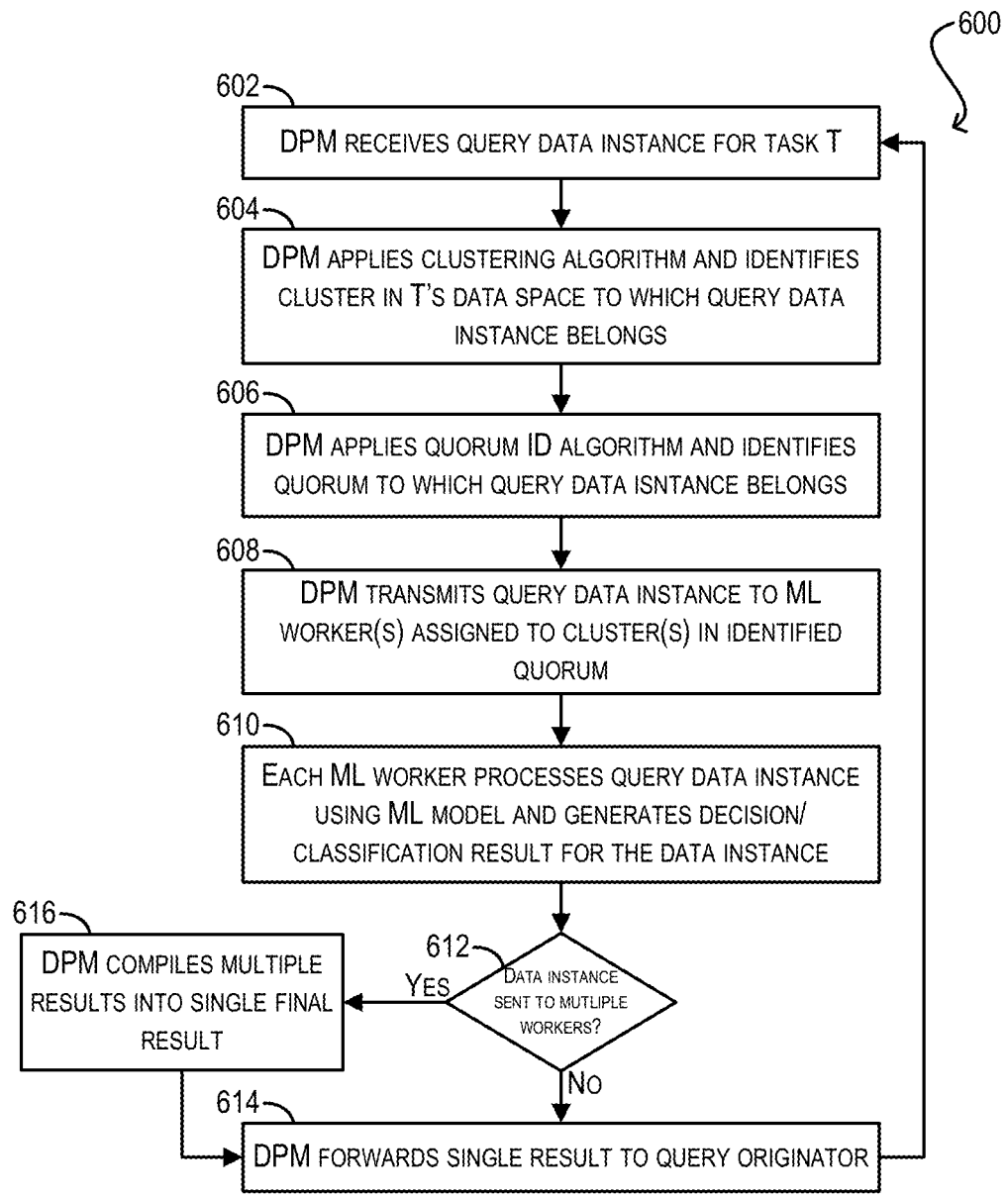
FIG. 6 depicts a workflow for executing the query phase for a machine learning task via the quorum-based approach according to an embodiment.

FIGS. 5 and 6 depict high-level workflows 500 and 600 that may be implemented by data partition module 102 of FIG. 1 (via classification component 106) for executing the training and query phases respectively for a machine learning task T via the quorum-based approach according to an embodiment. Like FIGS. 2 and 3, although FIGS. 5 and 6 assume that data partition module 102 processes a single training data instance (in the case of workflow 500) or a single query data instance (in the case of workflow 600) at a time, in certain embodiments data partition module 102 can process multiple training/query data instances in parallel via these workflows. Further, although FIG. 5 assumes that data partition module 102 and ML workers 104(1)-(N) operate according to an "online-online" training data availability model, other data availability models are possible (see section (6) below).

Starting with workflow 500 of FIG. 5 (training phase), data partition module 102 can receive a training data instance (i.e., a labeled data instance) for task T (block 502) and can apply a clustering algorithm in order to identify the cluster to which the data instance belongs (block 504). As in the case of the cluster-based approach, the clustering algorithm used here may be selected independently of, or based on, the ML functionality provided by ML workers 104(1)-(N).

Further, at block 506, data partition module 102 can apply an algorithm (referred to herein as a "quorum identification (ID) algorithm") to the training data instance and to the clusters created via the clustering algorithm in order to identify the quorum to which the training data instance belongs. The particular implementation of this algorithm can vary depending on the clustering algorithm used at block 504 and the desired nature/size of the quorums. For example, if K-means clustering is used at block 504, the algorithm at block 506 may identify the quorum for the training data instance as including all clusters whose centroids are no further from the data instance than the distance between the data instance and the closest centroid multiplied by a constant factor $\delta \geq 1$. In this example, $\delta$ can be a user-configurable parameter that affects the size of the quorums. In certain embodiments, data partition module 102 can perform the operations of blocks 504 and 506 (i.e., cluster identification and quorum identification) together as a single process or operation.

Once the quorum is identified, data partition module can transmit the training data instance to the ML worker(s) that are assigned to the cluster(s) in the quorum (block 508). Then, at block 510, each receiving ML worker can process the training data instance using its machine learning algorithm and thereby build (or build upon) an ML model for the worker's quorum of data using the received data. Finally, at the conclusion of block 510 (or block 508), data partition module 102 can return to block 502 in order to ingest and process additional training data instances as needed.

Turning now to workflow 600 of FIG. 6 (query phase), at block 602, data partition module 102 can receive a query data instance (i.e., an unlabeled data instance) for task T from a query originator (e.g., a client). At blocks 604 and 606, data partition module 102 can apply the same clustering and quorum identification algorithms as blocks 504 and 506 of workflow 500 in order to identify the quorum to which the query data instance belongs. In certain embodiments, blocks 604 and 606 can be merged into a single operation.

Upon identifying the data instance's quorum, data partition module 102 can transmit the query data instance to the ML worker(s) that are assigned to the cluster(s) in the quorum (block 608). In response, each receiving ML worker can process the query data instance using its ML model, generate a decision/classification result, and return the result to data partition module 102 (block 610). If data partition module 102 sent the query data instance to a single ML worker at block 608 (block 612), that module 102 will receive back a single decision/classification result from that single ML worker. In this case, data partition module 102 can simply forward the result to the query originator (block 614).

On the other hand, if data partition module 102 sent the query data instance to multiple ML workers at block 608, module 102 will receive back multiple decision/classification results (one from each ML worker) at block 610. In this case, data partition module 102 can compile the multiple results into a single final result (block 616) before forwarding it to the query originator (block 614). There are various ways in which data partition module 102 can perform this compilation. For example, in one set of embodiments, data partition module 102 can take a majority vote of results—in other words, assign a vote to each received worker of a result and select the result with the highest number of votes. If there is a tie, data partition module 102 can break the tie arbitrarily.

In another set of embodiments, data partition module 102 can select the received result with the highest weight, where the weight of each result is determined based on, e.g., the number of ML workers that voted for/returned that result (n) and their relative distances from the query data instance ($d_i$). For instance, one such weight function may be $weight_x = \Sigma_{i=1}^{n} 1_{(i\ predicted\ x)}/d_i$, where x is the classification result.

In yet another set of embodiments, data partition module 102 can receive distribution vectors from each ML worker where the distribution vector includes, for each possible decision/classification result, a probability (e.g., confidence level) that the result is correct. Data partition module 102 can then combine these various distribution vectors into a single final distribution vector (either in a weighted or unweighted manner) and can select the decision/classification result with the highest probability in the final distribution vector of being correct.

Finally, once data partition module 102 has sent the result to the query originator at block 614, data partition module 102 can return to block 602 in order to ingest and process additional query data instances as needed.

5. Handling Unbalanced Clustering

One potential issue with both the cluster-based and quorum based approaches is that the training data may be structured such that clustering results in unbalanced or heterogeneous clusters (i.e., clusters that vary significantly in terms of size). This can result in significantly different sized ML models at ML workers 104(1)-(N), which is undesirable.

To deal with this, two cluster balancing techniques can be employed at data partition module 102: (1) a first technique that involves creating hierarchical unions of relatively small clusters, such that a single ML worker builds and runs the corresponding ML models of all of those small clusters, and (2) a second technique that involves quorum-based partitioning of relatively large clusters (for the case where a single ML worker cannot build/run the correspond ML model of the large cluster).

Figure 7:
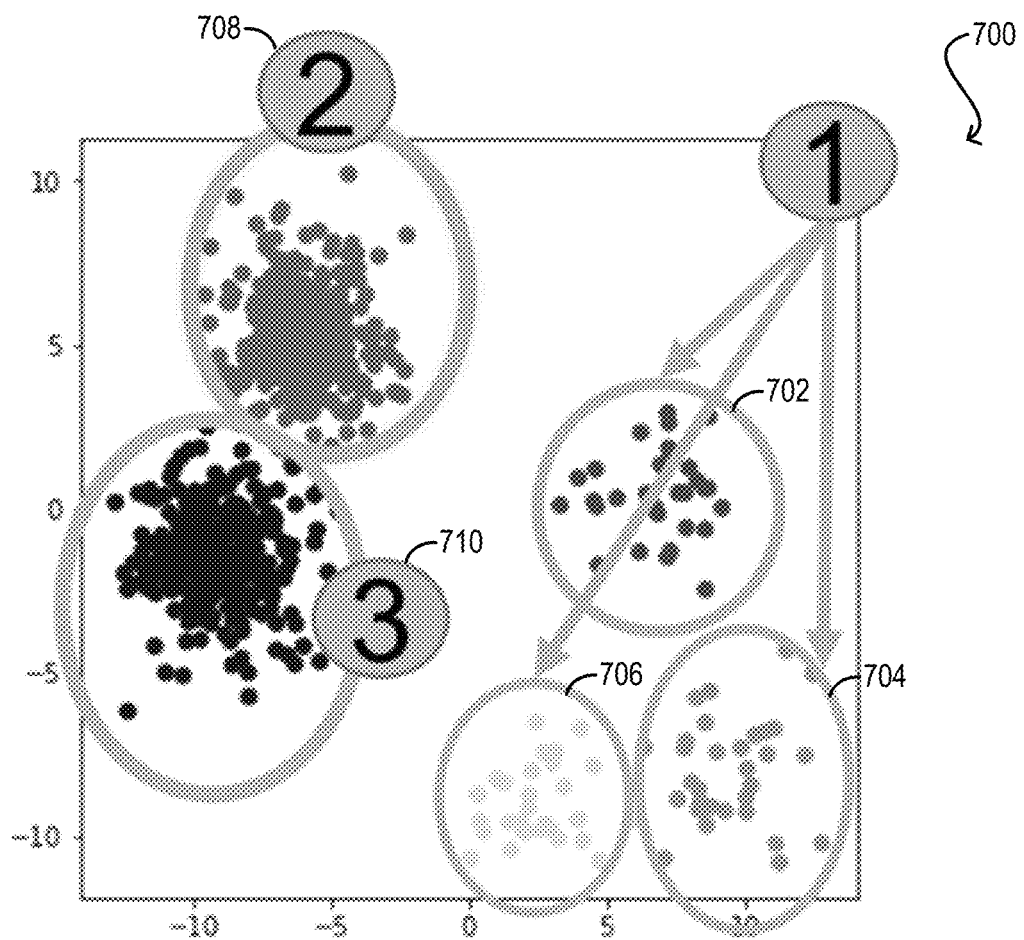
FIG. 7 depicts an example cluster set including small clusters.
Figure 8:
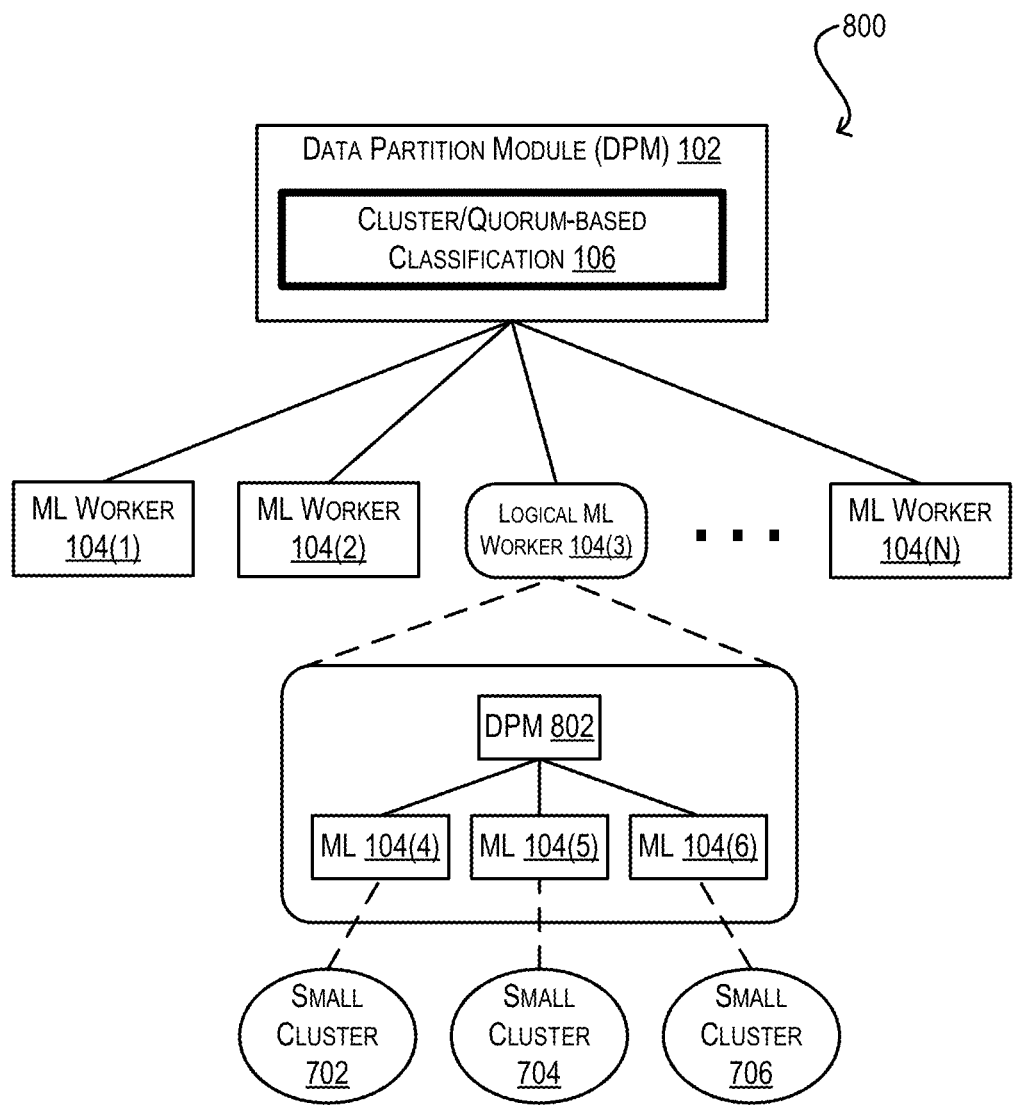
FIG. 8 depicts a system implementation for handling the small clusters of FIG. 7 according to an embodiment.

With regard to the first technique, FIG. 7 is a schematic diagram 700 illustrating five clusters 702, 704, 706, 708, and 710, of which three (702, 704, 706) are significantly smaller in size. In this case, data partition module 102 can unify these three smaller clusters into one larger cluster (denoted by the number (1)) and assign that larger cluster to a single logical ML worker with internal hierarchy. FIG. 800 depicts a system environment 800 implementing this. As shown in FIG. 8, data partition module 102 is connected to a logical ML worker 104(3), which comprises a simple data partition module 802 (i.e., a data partition module that does not have clustering/quorum-based classification component 106) and three physical ML workers 104(4), 104(5), 104(6). Simple data partition module 802 is configured to partition the data for the larger cluster into the three smaller clusters 702, 704, 706 and pass the data for these smaller clusters to physical ML workers 104(4), 104(5), 104(6) respectively for processing.

Figure 9:
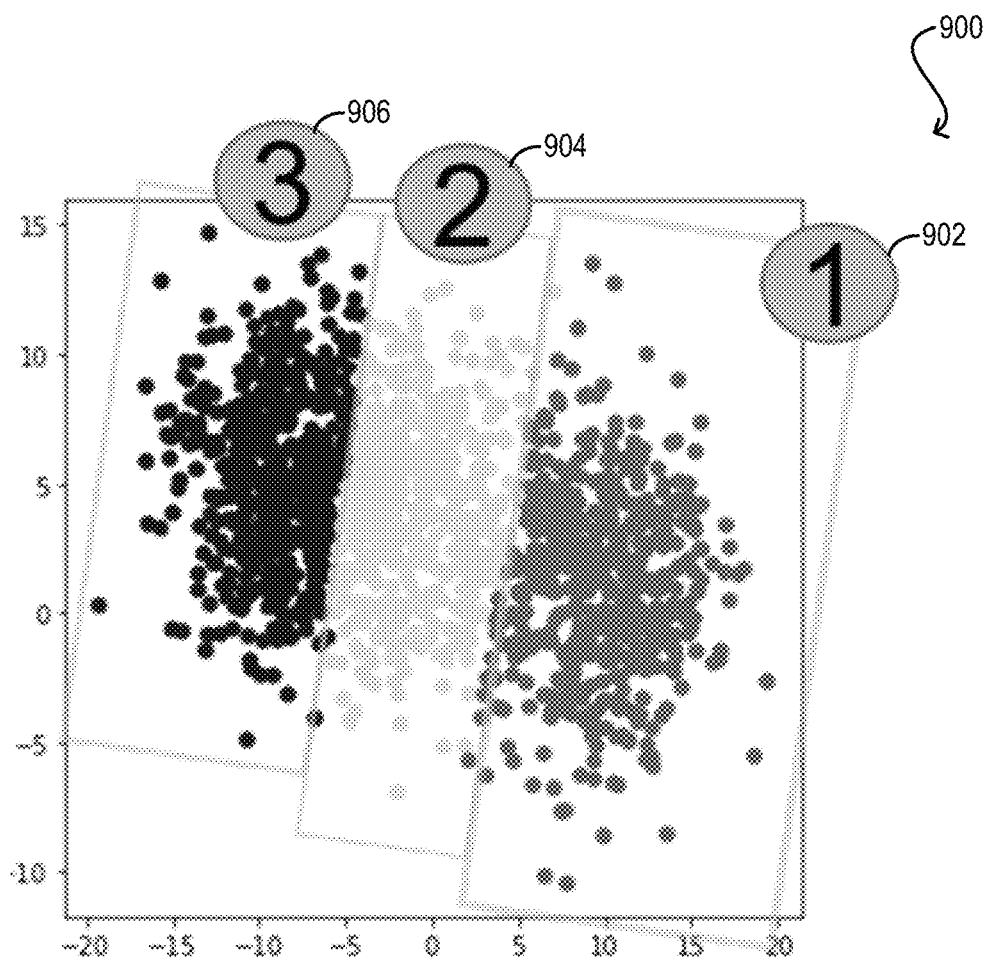
FIG. 9 depicts an example of a very large cluster.
Figure 10:
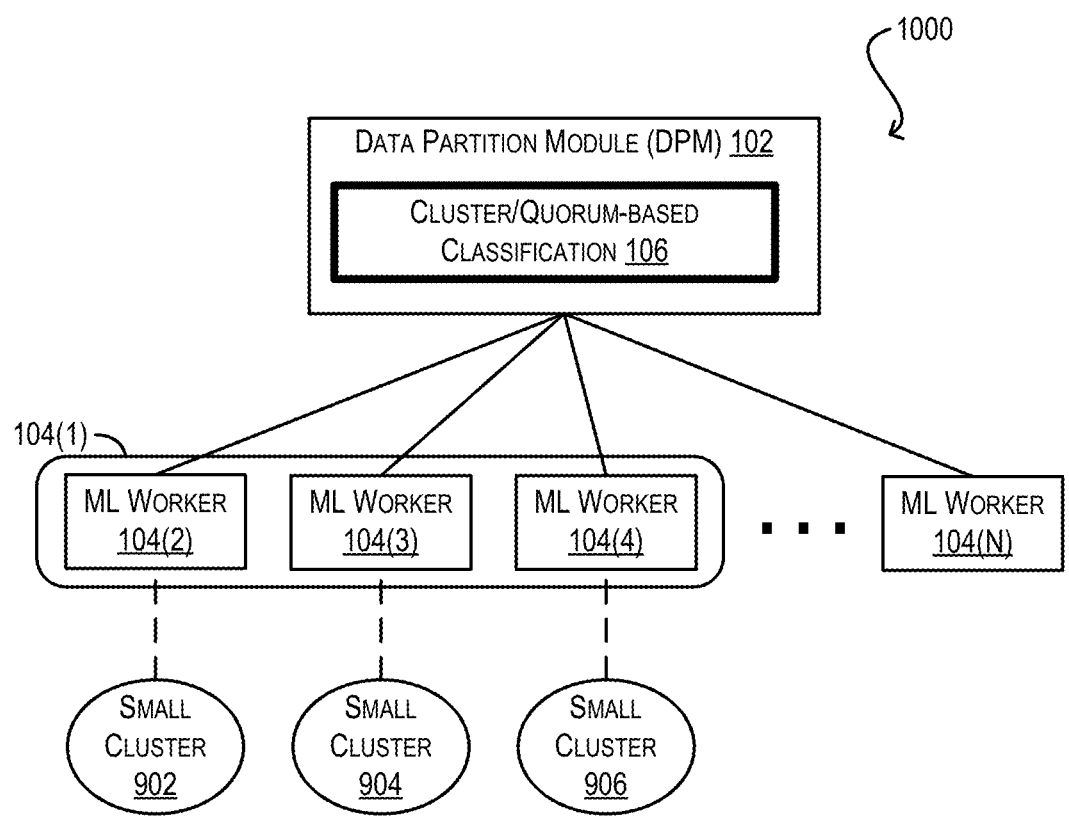
FIG. 10 depicts a system implementation for handling the very large cluster of FIG. 9 according to an embodiment.

With regard to the second technique, FIG. 9 is a schematic diagram 900 illustrating a single very large cluster. In this case, data partition module 102 can divide this single very large cluster into, e.g., three smaller clusters 902, 904, 906 and assign each smaller cluster to three physical ML workers (which are part of a logical ML worker corresponding to the single very large cluster. FIG. 10 depicts a system environment 1000 implementing this. As shown in FIG. 10, data partition module 102 is connected to a logical ML worker 104(1) which comprises three physical ML workers 104(2), 104(3), and 104(4). Data partition module 102 is configured to partition the data for the very large cluster of FIG. 9 into the three smaller clusters 902, 904, 906 and pass the data for these smaller clusters to physical ML workers 104(2), 104 (3), 104(4) respectively for processing.

6. Training Data Availability

There are a number of different data availability models that may be employed for implementing the training phase of an ML task on distributed system 100 of FIG. 1. These data availability models generally dictate whether training data is processed by data partition module 102 and ML workers 104(1)-(N) in an online (i.e., streaming) or offline (i.e., buffered) manner. Each of the data availability models are discussed in turn below.

In the following subsections, it is assumed for purposes of explanation that random forest (RF) is the machine learning algorithm used by ML workers 104(1)-(N) and K-means clustering is the clustering algorithm used by data partition module 102 for identifying clusters and quorums.

6.1 Offline-Offline

In this model, both data partition module 102 and ML workers 104(1)-(N) operate in an offline manner during the training phase. This means that data partition module 102 waits until it has received and stored (i.e., buffered) all of the training data for the task before classifying and sending that data to ML workers 104(1)-(N). Similarly, this means that each ML worker waits until it has received and buffered all of the training data for its assigned cluster/quorum of data before building/updating its ML model with that data.

Under this model, the training phase will generally follow the following sequence of events:

- Received training data is stored by data partition module 102
- Once data partition module 102 has received and stored all training data, data partition module 102 clusters the data into a sufficient number of clusters
- Data partition module 102 sends each cluster/quorum of training data to its assigned ML worker(s) 104 (this takes into consideration the balancing techniques described in section (5) above)
- Each ML worker 104 stores the training data it receives from data partition module 102
- Upon receiving and storing all of its training data, each ML worker 104 builds a random forest using the data 6.2 Online-Offline In this model, data partition module 102 operates in an online manner during the training phase while ML workers 104(1)-(N) operate in an offline manner during the training phase. This means that data partition module 102 classifies and sends training data to ML workers 104(1)-(N) "on-the-fly" (i.e., without buffering the data first). On the other hand, each ML worker waits until it has received and buffered all of the training data for its assigned cluster/quorum of data before building/updating its ML model with that data.

Under this model, the training phase will generally follow the following sequence of events:

- Data partition module 102 receives a stream of training data and either uses (1) batch K-means to cluster the streamed training data in batches (e.g., every 100 data instances), or (2) uses sequential K-means to cluster the streamed training data on a point-by-point/batch-by-batch basis; note that this will affect the locations of the cluster centroids
- Data partition module 102 sends each clustered data instance to the ML worker(s) 104 assigned to the data instance's cluster/quorum of data
- Each ML worker 104 stores the training data it receives from data partition module 102
- Upon receiving and storing all of its training data, each ML worker 104 builds a random forest using the data 6.3 Online-Online In this model, both data partition module 102 and ML workers 104(1)-(N) operate in an online manner during the training phase. This means that data partition module 102 classifies and sends training data to ML workers 104(1)-(N) on-the-fly. Similarly, each ML worker processes the training data it receives from data partition module 102 on-the-fly, without buffering the data.

Under this model, the training phase will generally follow the following sequence of events:

- Data partition module 102 receives a stream of training data and either uses (1) batch K-means to cluster the streamed training data in batches (e.g., every 100 data instances), or (2) uses sequential K-means to cluster the streamed training data on a point-by-point basis; note that this will affect the locations of the cluster centroids
- Data partition module 102 sends each clustered data instance to the ML worker(s) 104 assigned to the data instance's cluster/quorum of data
- Each ML worker 104 builds/updates its random forest for each training data instance/batch received from data partition module 102 using an online RF model (e.g., Mondrian forest)

It should be noted that while the offline-offline and online-offline models generally require training to occur before querying, in the online-online model there is no such restriction; training and query data may arrive arbitrarily.

Thus, in the online-online model, each ML worker may employ decaying memory, which means that older portions of the worker's ML model are aged out/removed over time. For example, in the case of a random forest classifier, old trees in the model would be periodically removed. This allows the worker's ML model to (1) adapt to changes in the incoming stream of training data, (2) prevents overfitting of the model over time, and (3) keeps the size of the ML model within a reasonable threshold.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing intelligent data partitioning in a distributed machine learning (ML) system, the method comprising:
   receiving, by a computer system implementing a data partition module, a training data instance for a ML task;
   identifying, by the computer system using a clustering algorithm, a cluster in a plurality of data clusters to which the training data instance belongs, wherein each cluster in the plurality of data clusters corresponds to a portion of an input data space of the ML task and is assigned to an ML worker in a plurality of ML workers, and wherein the identifying comprises determining that the training data instance is more strongly associated with the cluster than other clusters in the plurality of data clusters; and
   transmitting, by the computer system, the training data instance to a ML worker in the plurality of ML workers that is assigned to the cluster,
   wherein the ML worker is configured to build or update a ML model using the training data instance.

2. The method of claim 1 further comprising:
   receiving, by the computer system, a query data instance for the ML task;
   determining, by the computer system using the clustering algorithm, that the query data instance belongs to the cluster; and
   transmitting, by the computer system, the query data instance to the ML worker,
   wherein the ML worker is configured to generate a decision or classification result for the query data instance using the ML model.

3. The method of claim 1 further comprising:
   identifying, by the computer system, a quorum to which the training data instance belongs, the quorum comprising:
      the cluster to which the training data instance belongs; and
      zero or more other clusters in the plurality of data clusters, wherein clustering associations between the training data instance and the zero or more other clusters are approximately the same as a clustering association between the training data instance and the cluster to which the training data instance belongs; and
   transmitting, by the computer system, the training data instance to zero or more other ML workers in the plurality of ML workers assigned to the zero or more other clusters,
   wherein each of the zero or more other ML workers is configured to build or update another ML model using the training data instance.

4. The method of claim 3 further comprising:
   receiving, by the computer system, a query data instance for the ML task;
   determining, by the computer system, that the query data instance belongs to the quorum; and
   transmitting, by the computer system, the query data instance to the ML worker and the zero or more other ML workers;
   wherein each of the ML worker and the zero or more other ML workers is configured to generate a decision or classification result for the query data instance using its respective ML model.

5. The method of claim 4 wherein if the computer system receives multiple decision or classification results in response to transmitting the query data instance to the ML worker and the zero or more other ML workers, the computer system is configured to compile the multiple decision or classification results into a single, final decision or classification result.

6. The method of claim 1 wherein the plurality of data clusters includes two or more small clusters that are smaller in size than other clusters in the plurality of data clusters, and wherein the computer system is configured aggregate the two or more small clusters into a larger cluster and assign the larger cluster to a logical ML worker of the distributed ML system.

7. The method of claim 1 wherein the plurality of data clusters include a large cluster that is larger in size than other clusters in the plurality of data clusters, and wherein the computer system is configured to split the large cluster into two or more smaller clusters and assign each of the two or more smaller clusters to a separate ML worker.

8. A non-transitory computer readable storage medium having stored thereon program code executable by a computer system implementing a data partition module for a distributed machine learning (ML) system, the program code embodying a method comprising:
   receiving a training data instance for a ML task;
   identifying, using a clustering algorithm, a cluster in a plurality of data clusters to which the training data instance belongs, wherein each cluster in the plurality of data clusters corresponds to a portion of an input data space of the ML task and is assigned to an ML worker in a plurality of ML workers, and wherein the identifying comprises determining that the training data instance is more strongly associated with the cluster than other clusters in the plurality of data clusters; and
   transmitting the training data instance to a ML worker in the plurality of ML workers that is assigned to the cluster,
   wherein the ML worker is configured to build or update a ML model using the training data instance.

9. The non-transitory computer readable storage medium of claim 8 wherein the method further comprises:
   receiving a query data instance for the ML task;
   determining, using the clustering algorithm, that the query data instance belongs to the cluster; and
   transmitting the query data instance to the ML worker, wherein the ML worker is configured to generate a decision or classification result for the query data instance using the ML model.

10. The non-transitory computer readable storage medium of claim 8 wherein the method further comprises:
identifying a quorum to which the training data instance belongs, the quorum comprising:
the cluster to which the training data instance belongs; and
zero or more other clusters in the plurality of data clusters, wherein clustering associations between the training data instance and the zero or more other clusters are approximately the same as a clustering association between the training data instance and the cluster to which the training data instance belongs; and
transmitting the training data instance to zero or more other ML workers in the plurality of ML workers assigned to the zero or more other clusters,
wherein each of the zero or more other ML workers is configured to build or update another ML model using the training data instance.

11. The non-transitory computer readable storage medium of claim 10 wherein the method further comprises:
receiving a query data instance for the ML task;
determining that the query data instance belongs to the quorum; and
transmitting the query data instance to the ML worker and the zero or more other ML workers;
wherein each of the ML worker and the zero or more other ML workers is configured to generate a decision or classification result for the query data instance using its respective ML model.

12. The non-transitory computer readable storage medium of claim 11 wherein if the computer system receives multiple decision or classification results in response to transmitting the query data instance to the ML worker and the zero or more other ML workers, the computer system is configured to compile the multiple decision or classification results into a single, final decision or classification result.

13. The non-transitory computer readable storage medium of claim 8 wherein the plurality of data clusters includes two or more small clusters that are smaller in size than other clusters in the plurality of data clusters, and wherein the computer system is configured aggregate the two or more small clusters into a larger cluster and assign the larger cluster to a logical ML worker of the distributed ML system.

14. The non-transitory computer readable storage medium of claim 8 wherein the plurality of data clusters include a large cluster that is larger in size than other clusters in the plurality of data clusters, and wherein the computer system is configured to split the large cluster into two or more smaller clusters and assign each of the two or more smaller clusters to a separate ML worker.

15. A computer system implementing a data partition module for a distributed machine learning (ML) system, the computer system comprising:
a processor; and
a non-transitory computer readable medium having stored thereon program code that, when executed, causes the processor to:
receive a training data instance for a ML task;
identify, using a clustering algorithm, a cluster in a plurality of data clusters to which the training data instance belongs, wherein each cluster in the plurality of data clusters corresponds to a portion of an input data space of the ML task and is assigned to an ML worker in a plurality of ML workers, and wherein the identifying comprises determining that the training data instance is more strongly associated with the cluster than other clusters in the plurality of data clusters; and
transmit the training data instance to a ML worker in the plurality of ML workers that is assigned to the cluster,
wherein the ML worker is configured to build or update a ML model using the training data instance.

16. The computer system of claim 15 wherein the program code further causes the processor to:
receive a query data instance for the ML task;
determine, using the clustering algorithm, that the query data instance belongs to the cluster; and
transmit the query data instance to the ML worker,
wherein the ML worker is configured to generate a decision or classification result for the query data instance using the ML model.

17. The computer system of claim 15 wherein the program code further causes the processor to:
identify a quorum to which the training data instance belongs, the quorum comprising:
the cluster to which the training data instance belongs; and
zero or more other clusters in the plurality of data clusters, wherein clustering associations between the training data instance and the zero or more other clusters are approximately the same as a clustering association between the training data instance and the cluster to which the training data instance belongs; and
transmit the training data instance to zero or more other ML workers in the plurality of ML workers assigned to the zero or more other clusters,
wherein each of the zero or more other ML workers is configured to build or update another ML model using the training data instance.

18. The computer system of claim 17 wherein the program code further causes the processor to:
receive a query data instance for the ML task;
determine that the query data instance belongs to the quorum; and
transmit the query data instance to the ML worker and the zero or more other ML workers;
wherein each of the ML worker and the zero or more other ML workers is configured to generate a decision or classification result for the query data instance using its respective ML model.

19. The computer system of claim 18 wherein if the computer system receives multiple decision or classification results in response to transmitting the query data instance to the ML worker and the zero or more other ML workers, the computer system is configured to compile the multiple decision or classification results into a single, final decision or classification result.

20. The computer system of claim 15 wherein the plurality of data clusters includes two or more small clusters that are smaller in size than other clusters in the plurality of data clusters, and wherein the computer system is configured aggregate the two or more small clusters into a larger cluster and assign the larger cluster to a logical ML worker of the distributed ML system.

21. The computer system of claim 15 wherein the plurality of data clusters include a large cluster that is larger in size than other clusters in the plurality of data clusters, and wherein the computer system is configured to split the large cluster into two or more smaller clusters and assign each of the two or more smaller clusters to a separate ML worker.

\* \* \* \* \*